United States Patent

Curtis

[11] 3,923,779
[45] Dec. 2, 1975

[54] PROCESSES FOR SYNTHESIZING AZO COMPOUNDS

[75] Inventor: Harris L. Curtis, Needham, Mass.

[73] Assignee: Polaroid Corporation, Cambridge, Mass.

[22] Filed: Mar. 26, 1970

[21] Appl. No.: 20,482

Related U.S. Application Data

[63] Continuation of Ser. No. 655,304, July 24, 1967, abandoned.

[52] U.S. Cl. ............... 260/202; 260/162; 260/197; 260/404.5; 260/519 R; 260/574; 260/689; 260/691; 260/372; 260/373; 260/374; 260/377
[51] Int. Cl.² .................................. C07C 107/04
[58] Field of Search ................ 260/197, 202, 162

[56] References Cited
UNITED STATES PATENTS
2,597,676  5/1952  Schetty ........................ 260/197 X OTHER PUBLICATIONS
Sidgwick's Organic Chemistry of Nitrogen, Clarendon Press: Oxford, 1966, pp. 143, 224–225.
Wagner and Zook, Synthetic Organic Chemistry, John Wiley & Sons, Inc.: New York, 1953, pp. 171–172, 228–229, 654–655.

*Primary Examiner*—Floyd D. Higel
*Assistant Examiner*—C. F. Warren
*Attorney, Agent, or Firm*—John P. Morley

[57] ABSTRACT

A method for preparing compounds of the formula:

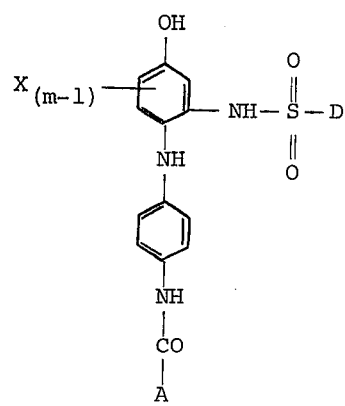

wherein:
A is an alkyl radical of at least nine carbon atoms;
D is a monoazo, disazo or anthraquinone dye moiety;
X is alkyl, alkoxy, hydroxy, amino, chloro or carboxy; and
$m$ is an integer from 1–5. The compounds are useful in photographic processes for preparing colored image.

5 Claims, No Drawings

PROCESSES FOR SYNTHESIZING AZO COMPOUNDS

This application is a continuation of Ser. No. 655,304, filed July 24, 1967, and now abandoned.

BACKGROUND OF INVENTION

The application of Stanley M. Bloom, Ser. No. 655,338 filed July 24, 1967, now U.S. Pat. No. 3,751,406 discloses novel chemical compounds containing a dye moiety and which also have an "anchoring" moiety which renders the compound immobile and non-diffusible in a photographic processing composition. Upon oxidation, these compounds may autoreact intramolecularly in such a way as to form a new heterocyclic ring and, as a function of such reaction, to split off the dye moiety as a mobile and diffusible color-providing material.

One group of compounds of this description are represented in this copending application as being of the formula:

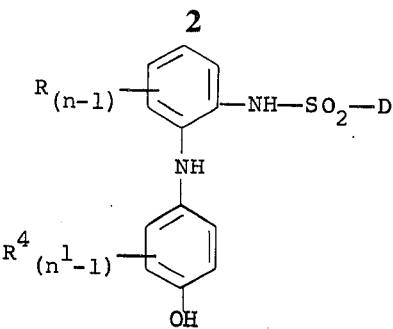

wherein: each of R and R⁴ comprises a long chain amide, e.g., of at least 13 carbon atoms; D represents a dye moiety, e.g., a monoazo, disazo or anthraquinone dye moiety; and n and $n^1$ may be 1 or 2, provided that at least one of them is 2 to provide an anchoring moiety; and nuclear substituted derivatives thereof, e.g., where any of the nuclear carbon atoms of the respective benzene moieties not containing one of the specifically designated substituents may contain a carboxy, alkyl, alkoxy, amino, chloro, hydroxy or amide substituent.

Such compounds may be prepared by the following sequence of reactions:

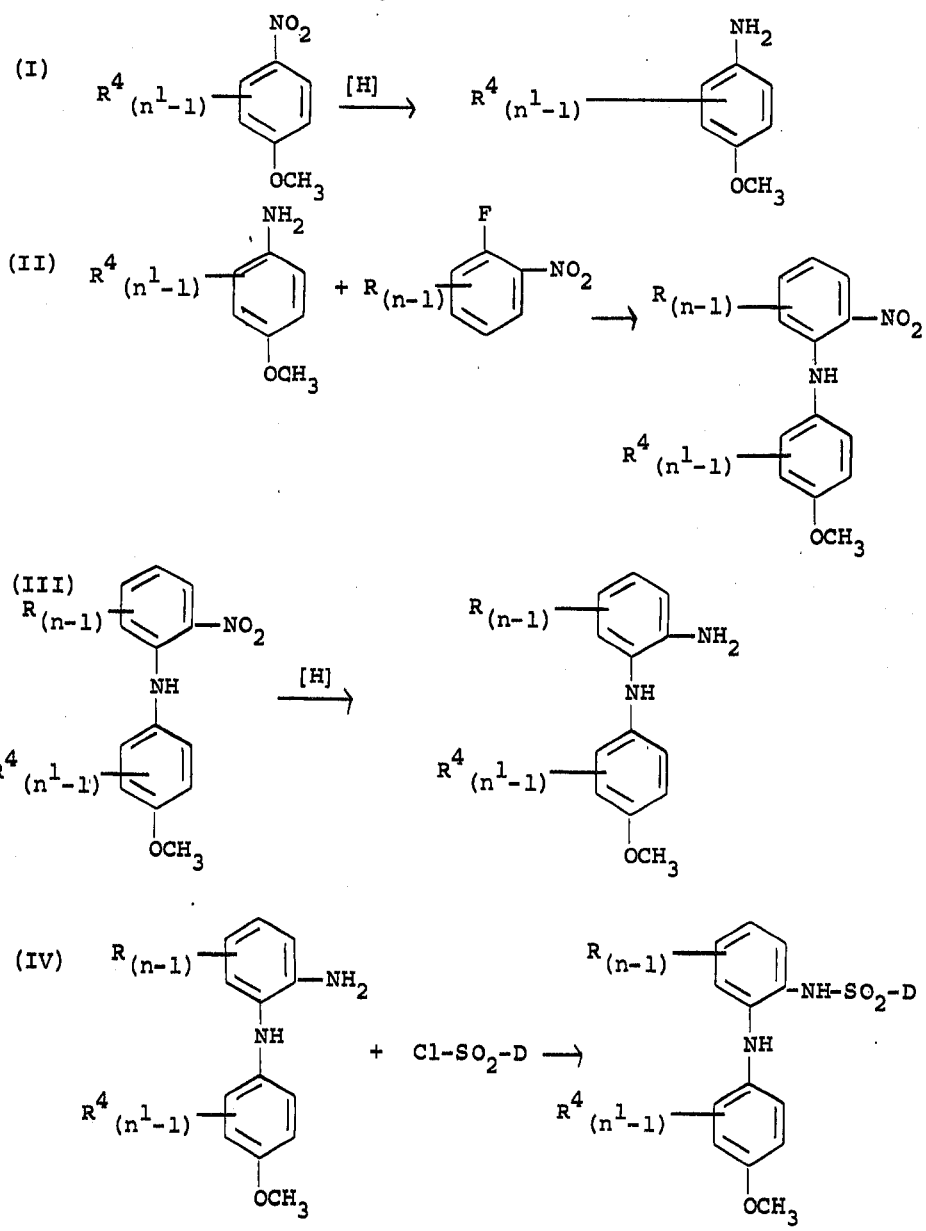

(V)

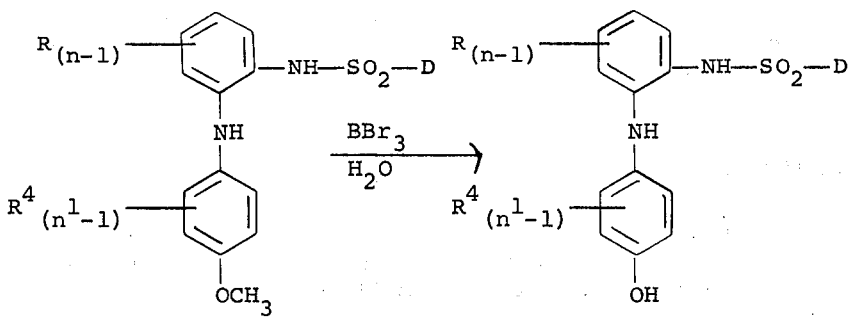

The present invention is directed to novel procedures for preparing certain compounds within the scope of the above-mentioned formula, which procedures make it possible to utilize a greater range of more readily available compounds which in turn makes it possible to synthesize more conveniently a wider range of the desired compounds.

SUMMARY

The compounds within the scope of the abovementioned formula and to which this invention is directed may be represented by the formula:

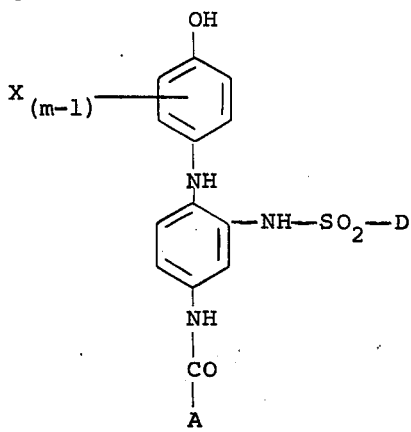

wherein:
$D-SO_2-$ is the monovalent radical of a dye;
$D-SO_2-Cl$ and D is a monoazo, disazo or anthraquinone dye moiety;
A is an alkyl radical of at least nine carbon atoms;
X represents an alkyl radical, e.g., methyl, an alkoxy radical, e.g., methoxy, hydroxy, amino, chloro, or carboxy; and
m is a positive integer from 1-5, inclusive, it being understood that where m is 1, hydrogen atoms are bonded to the respective four unsubstituted carbon atoms, i.e., the p-hydroxyanilino moiety is unsubstituted.

According to the present invention, compounds of the foregoing description are prepared by the steps of: (I) coupling a protected hydroxy derivative of a p-hydroxyaniline silver halide developing agent, i.e., p-hydroxyaniline or a substituted derivative thereof, with an o-fluoro-nitrobenzene containing the designated anchoring moiety; (II) reducing the nitro group to a primary amino substituent; (III) reacting the latter compound with the sulfonyl chloride salt of the desired dye; and hydrolyzing to remove the protective group and thereby to form the desired compound.

As was mentioned previously, this invention relates to novel procedures for preparing compounds useful in photographic processes for preparing color images.

A primary object of this invention, therefore, is to provide novel procedures of the foregoing description.

Another object is to provide novel procedures for preparing dyes employing more readily available compounds as starting materials.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure.

For a fuller understanding of the nature and objects of the invention, reference should be had to the following detailed description.

The novel process of this invention by which the aforementioned objectives are accomplished may be illustrated by the following sequence of steps:

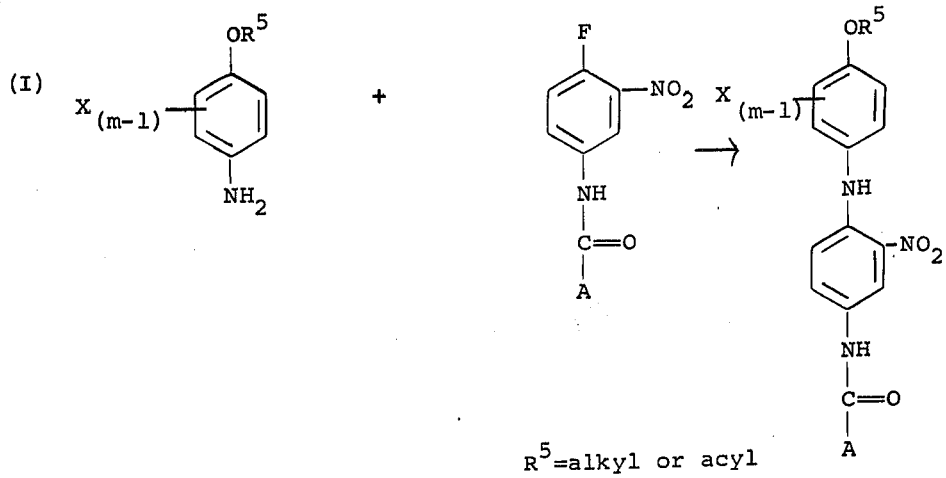

$R^5$ = alkyl or acyl

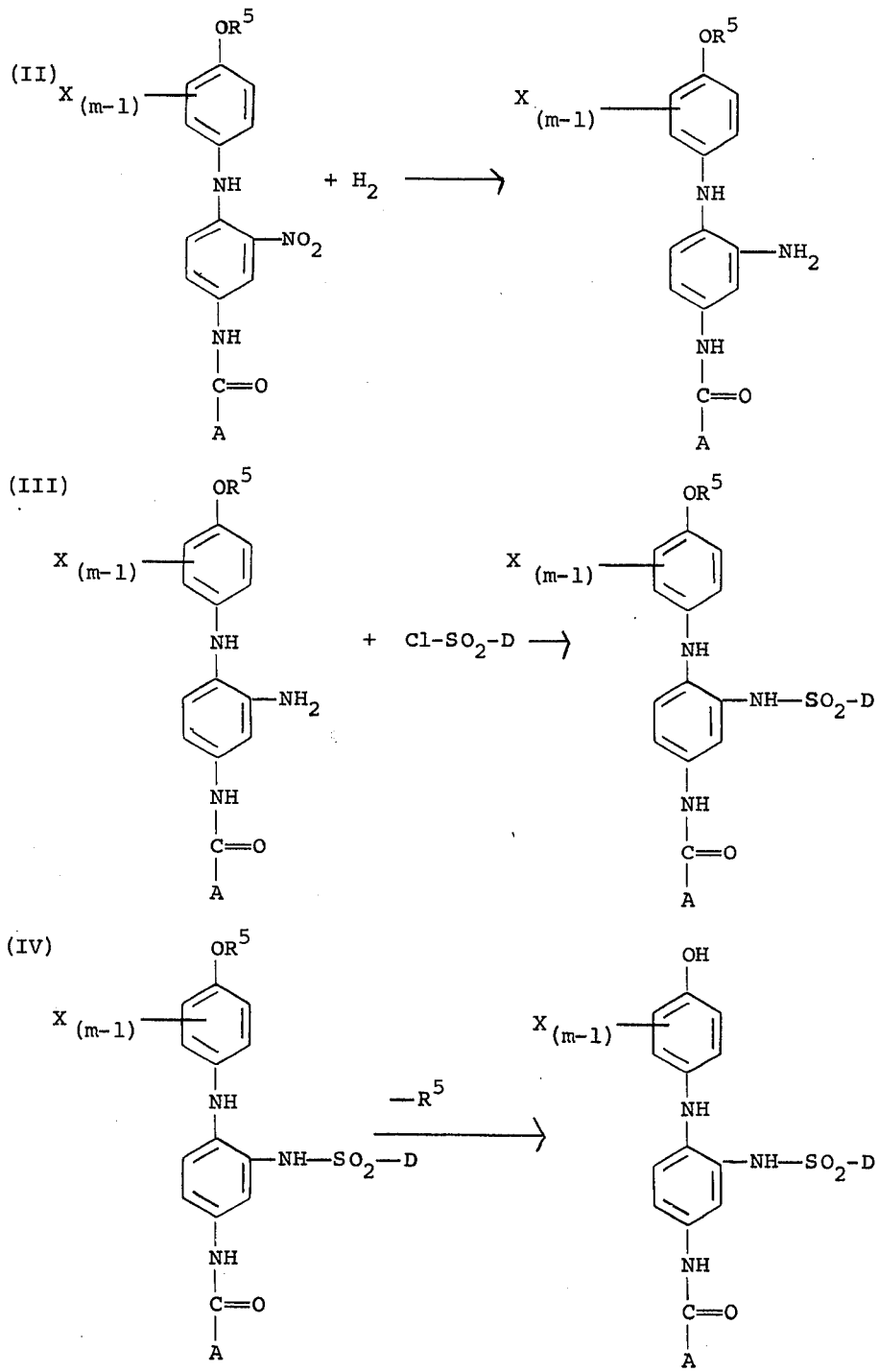

The starting protected p-aminophenol of step I may be prepared by replacing the hydrogen atom of the hydroxyl moiety with an alkyl or -O-alkyl substituent in known manner, e.g., methylation to provide a methoxy moiety. P-aminophenols from which the starting protected derivative may be obtained may be selected from those heretofore known in the art, e.g., p-aminophenol, 4-amino-2-methyl-phenol, 4-amino-2-methoxy-phenol, 4-amino-2-carboxyphenol, 4-amino-2-chloro-phenol, 4-amino-2,6-dimethyl-phenol, 4-amino-2,6-dimethoxy-phenol, 4,6-diamino-2-methyl-phenol, 4-amino-2-ethoxy-phenol, 4-amino-2-propoxy-phenol, 4-amino-2-butoxy-phenol, 4-amino-2-amyl-phenol, 4-amino-3-methyl-phenol, 4-amino-3-ethyl-phenol, 4-amino-3-pentadecyl-phenol, 4-amino-3-decyl-phenol, 4-amino-2,6-dichlorophenol, 4-amino-2-methoxy-6-methyl-phenol, 4-amino-2-ethoxy-6-methyl-phenol, 4-amino-2-methyl-6-propyl-phenol, 4-amino-2,3-dimethyl-phenol, 4-amino-3,5-dimethyl-phenol, 4-amino-3-methyl-5-propyl-phenol, 4-amino-2,5-dimethyl-phenol, 4-amino-2-isopropyl-5-methyl-phenol, 4-amino-2,5-dimethoxy-phenol, etc.

In the preferred embodiment, the protected derivative of an aminophenol, e.g., one of those mentioned above, is obtained by methylation in known manner, for example, by reaction with dimethylsulfate.

The starting amide of step 1 may be prepared in known manner by the following reaction:

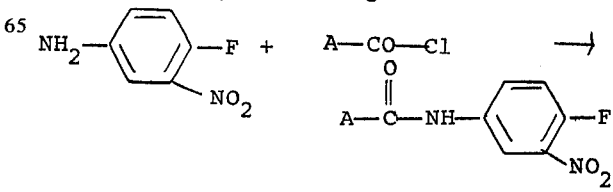

The reduction of step II may be performed by hydrogenation in the presence of a catalyst, i.e., introducing hydrogen gas into a mixture containing the nitro compound and one of the known hydrogenation catalysts, e.g., Pd/BaSO₄, Raney nickel, etc.

The sulfonyl chloride salt may be such a salt of any of the monoazo, disazo or anthraquinone dyes heretofore known in the art and may comprise such a salt of any of the dye moieties disclosed in the aforementioned application Ser. No. 655,338 filed July 24, 1967, now U.S. Pat. No. 3,751,406. In general, dyes containing a sulfonyl chloride substituent making them useful in the practice of this invention are well known. Accordingly, a long list of useful dyes which may be employed will be readily suggested to those skilled in the art. The preparation of such dyes is described in numerous texts and therefore will also be apparent to those skilled in the art. (See, for example, "Synthetic Dyes" by Venkataraman, 1952, Vol. I. pp. 197–201.)

The removal of the protective groups to form the desired hydroxy substituent (Step IV) may be accomplished by known hydrolysis techniques. In the preferred embodiment wherein R⁵ is methyl, the desired dimethylation may, for example, be obtained by complexing with boron tribromide, followed by decomposition of the resulting complex with water.

The various reaction conditions, e.g., time, temperature and pressure of reaction, selection of solvents to form the reaction mixture, etc., are not critical to the practice of this invention and will be readily apparent to those skilled in the art in the light of the foregoing description. The essence of the invention is, therefore, the aforementioned selection of steps, in the order described, to obtain the desired dyes.

The following example shows by way of illustration and not by way of limitation the practice of this invention.

EXAMPLE 1

Fifteen grams of 4-fluoro-5-nitro-aniline, 35.0 grams of stearoyl chloride and 8.4 g. of sodium bicarbonate were stirred overnight at room temperature. The reaction mixture was then refluxed and the insoluble inorganic salts were filtered off. Upon cooling of the filtrate, an off-white solid was obtained, m.p. 82°–83° C., having the formula:

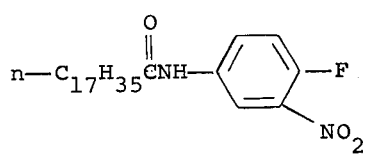

Thirty grams of 3-carboxy-4-methoxy-aniline was added to 75.0 g. of the 5-stearamido-2-fluoro-nitrobenzene (prepared above) and 45.0 g. of potassium acetate in 225 ml. of dimethyl sulfoxide. The resulting mixture was stirred over a weekend under a flow of nitrogen while maintaining the temperature at about 100° C. It was then poured into a large amount of cold water and the resulting precipitate was filtered, washed with water and a small amount of ethanol. This crude product was then recrystallized from acetic acid to yield 36 g. of a yellow solid, m.p. 186°–187° C., of the formula:

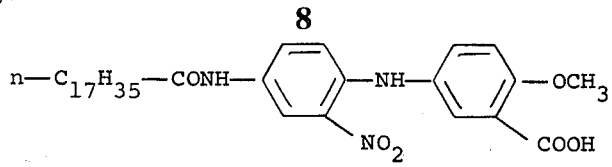

Four grams of the last-mentioned compound was hydrogenated in ethanol with a Pd/BaSO₇ catalyst to reduce the nitro group to an amino substituent. Following hydrogenation for about two hours, the product was filtered and quickly cooled to obtain 3 g. of the amine, a nearly white solid, m.p. 115° C. Seven g. of this amine was added to 4.7 g. of 4'-(sulfonyl-chloride)-phenylazo-2-naphthol in 100 ml. of pyridine under nitrogen. The mixture was allowed to stand overnight at room temperature. It was then heated on a steam cone for 30 minutes, then poured into 600 ml of 10% HCl, filtered and then rinsed with water and a small amount of methanol. The resulting solid was next triturated with warm methylene chloride and filtered to yield 4.6 g. of a yellow solid, m.p. 138°–140° C., of the formula:

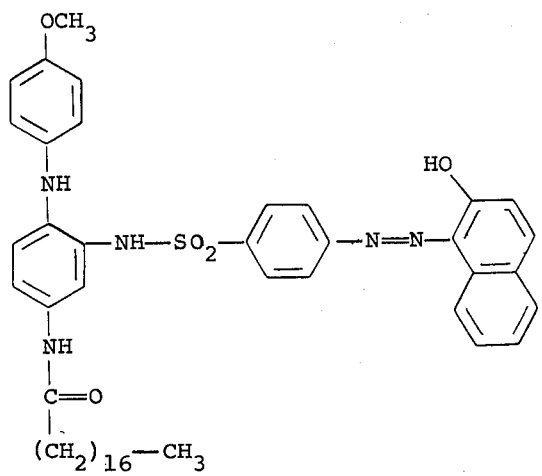

5.0 g. of the last-named compound was added to an unmeasured amount (about 60 ml.) of methylene chloride and 15 ml. of boron tribromide. The mixture was stirred overnight. The starting material went into solution as it complexed with the boron tribromide. The complex was decomposed with water, then triturated with hot water, methanol and hexane to yield 4.6 g. of a yellow solid, m.p. 260° C. of the formula:

As examples of other compounds which may be prepared in accordance with this invention, mention may be made of the following:

(1) 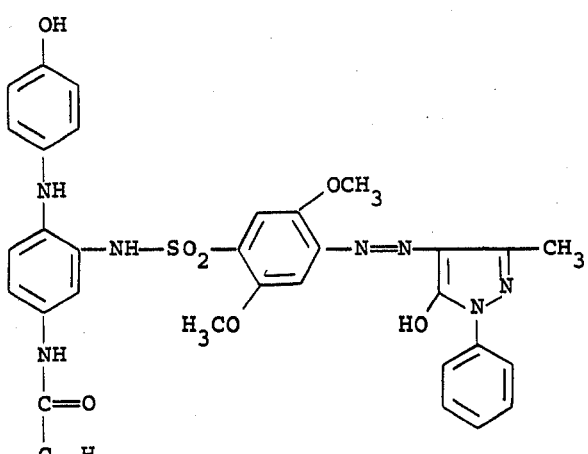
(2) 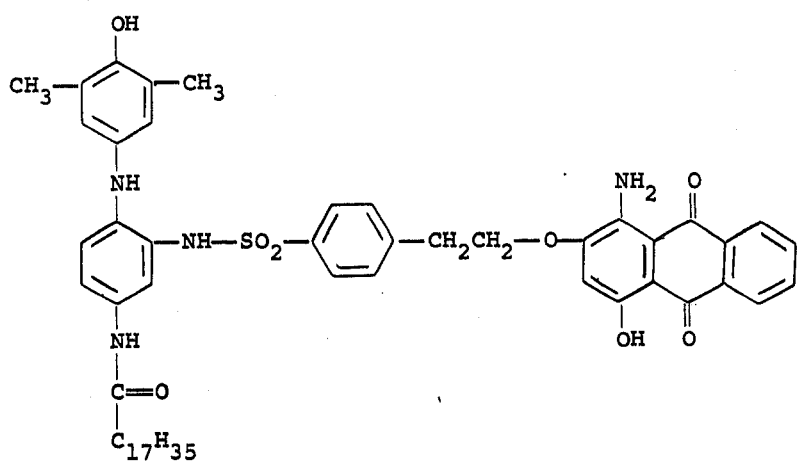
(3) 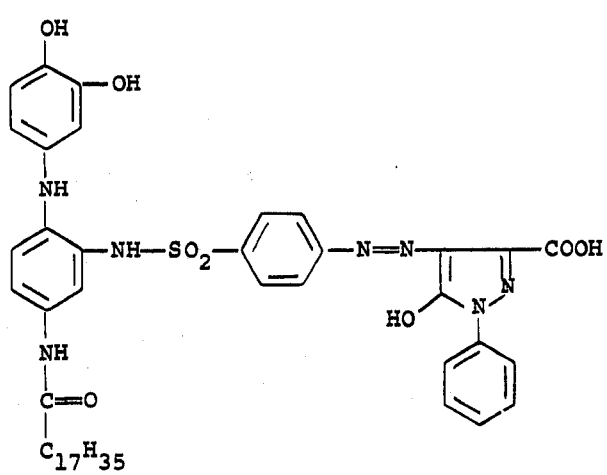
(4) 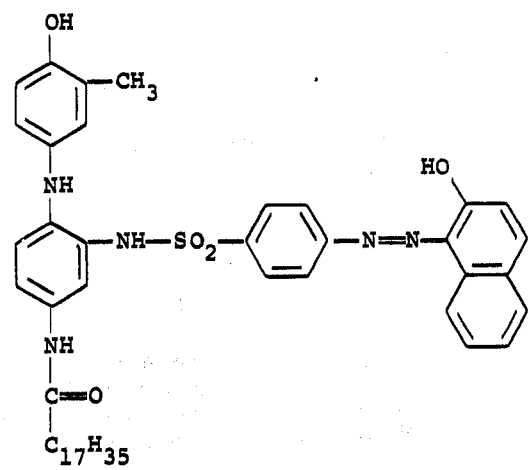

The aforementioned compounds are for purposes of illustration only, it being understood that the preparation of compounds containing any of the previously mentioned aminophenol moieties and any of the dye moieties heretofore known are contemplated by this invention.

The compounds prepared by the present invention are dyes which are of particular use in the photographic systems described and claimed in the copending applications of Stanley M. Bloom and Howard G. Rogers, Ser. No. 655,440 now U.S. Pat. No. 3,443,940; Stanley M. Bloom and Robert K. Stephens, Ser. Nos. 655,501 filed July 24, 1967 now abandoned in favor of application Ser. No. 789,837 filed Jan. 8, 1969, now U.S. Pat. No. 3,498,785 issued Mar. 3, 1970 and 655,436 filed July 24, 1967 now U.S. Pat. No. 3,443,939 issued May 13, 1969 all filed concurrently.

Since certain changes may be made in the above product and process without departing from the scope of the invention herein involved, it is intended that all matter contained in the above description shall be interpreted as illustrative and not in a limiting sense.

What is claimed is:

1. A process which comprises the steps of:
   a. reacting a compound of the formula:

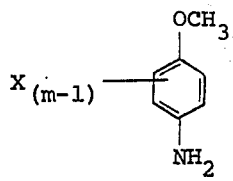

with a compound of the formula:

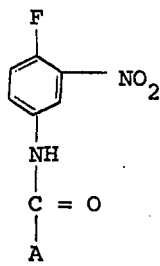

to form a compound of the formula:

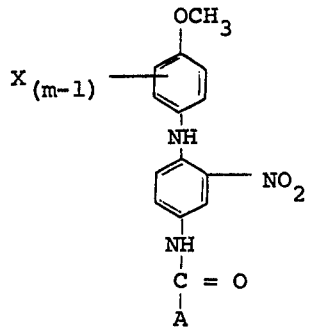

b. reducing the nitro group of said last-named compound to form a compound of the formula:

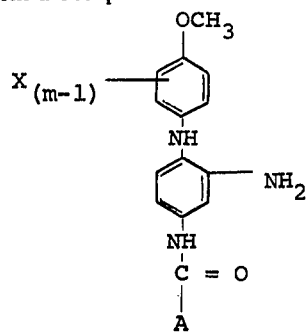

c. reacting said last-named compound with a dye salt of the formula:
$Cl-SO_2-D$ to form a compound of the formula:

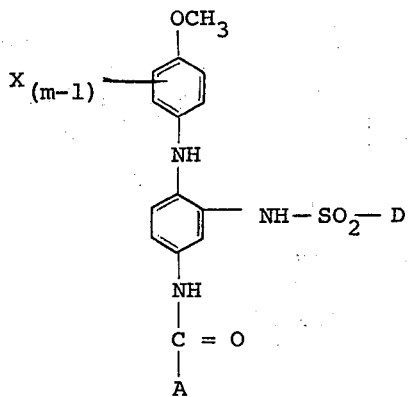

and d. removing said $CH_3$ moiety to form a compound of the formula:

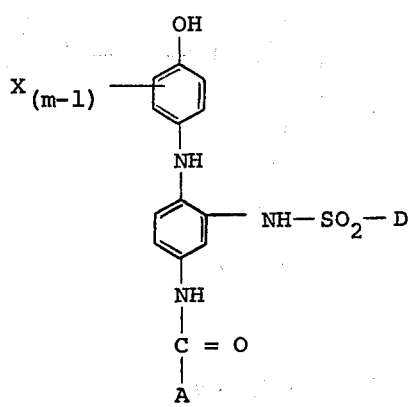

wherein:
X is methyl, methoxy, hydroxy, amino, chloro, or carboxy;
$m$ is a positive integer from 1 to 2;
A is an alkyl radical having from 9–17 carbon atoms and which can render the compound non-diffusible; and
D is an azo dye moiety.

2. A process as defined in claim 1 wherein said reducing step is effected by introducing hydrogen gas into a mixture comprising the nitro compound to be reduced and a hydrogenation catalyst.

3. A process as defined in claim 1 wherein said $CH_3$ moiety is removed in step (d) by complexing said $CH_3$—containing compound with boron tribromide and thereafter decomposing the resulting complex with water to form said hydroxyl substituent.

4. A process of claim 1 which comprises reacting 5-stearamido-2-fluoro-nitrobenzene with 3-carboxy-4-methoxy-aniline to form:

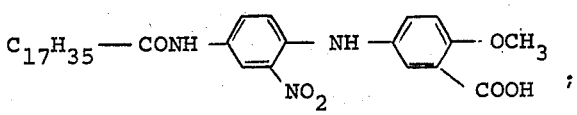

hydrogenating said last-named compound to reduce the nitro group to a primary amino group; and reacting the thus-formed amine with 4'-(sulfonylchloride)-phenylazo-2-naphthol to form:

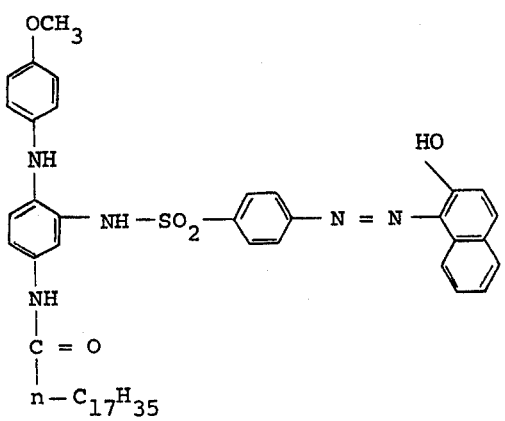
5. A process as defined in claim 4 including the step of demethylating said last-mentioned compound to form a compound of the formula:
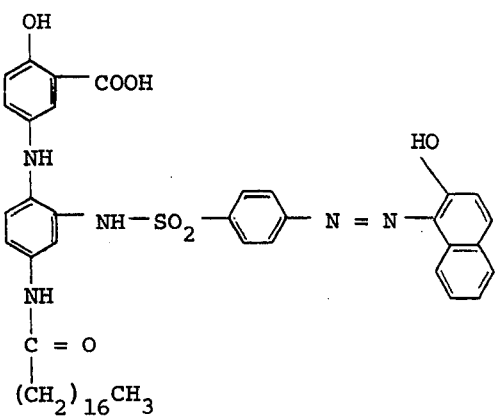
* * * * *